(12) United States Patent
Johnson et al.

(10) Patent No.: US 6,729,454 B2
(45) Date of Patent: May 4, 2004

(54) TRANSMISSION WITH A TWO-STEP ACTUATOR VALVE

(75) Inventors: Douglas Rene Johnson, Waterloo, IA (US); Trent Lynn Goodnight, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/139,412

(22) Filed: May 6, 2002

(65) Prior Publication Data

US 2003/0205440 A1 Nov. 6, 2003

(51) Int. Cl.[7] ............................................... F16D 25/10
(52) U.S. Cl. .................................... 192/3.58; 192/87.13
(58) Field of Search ......................... 192/3.58, 87.13, 192/87.18, 85 R; 91/531; 137/596.16; 74/335

(56) References Cited

U.S. PATENT DOCUMENTS

| | | | |
|---|---|---|---|
| 3,882,980 A | | 5/1975 | Blake |
| 3,990,553 A | | 11/1976 | Holzinger et al. |
| 4,422,536 A | | 12/1983 | Shatuck |
| 4,515,255 A | | 5/1985 | Haley et al. |
| 4,535,681 A | * | 8/1985 | Nakamura et al. ............ 91/531 |
| 4,560,045 A | * | 12/1985 | Walsh ........................ 192/3.58 |
| 4,658,705 A | * | 4/1987 | Maeda ........................ 91/531 |
| 4,957,016 A | * | 9/1990 | Amedei et al. ............... 74/335 |
| 5,072,814 A | * | 12/1991 | Hama et al. ............. 192/85 R |
| 5,329,826 A | * | 7/1994 | Graves et al. ................ 74/335 |

* cited by examiner

Primary Examiner—Rodney H. Bonck

(57) ABSTRACT

A transmission having one or more clutches and brakes wherein only one clutch or brake need be engaged to connect the input to the output is equipped with a two-step actuator valve arrangement in which two valves, arranged in series, must be opened before any clutch or brake is engaged to power the output shaft. A single first-step actuator valve is arranged in series with a plurality of second-step actuator valves. Each of the second-step valves controls a clutch or brake.

7 Claims, 2 Drawing Sheets

TRANSMISSION WITH A TWO-STEP ACTUATOR VALVE

BACKGROUND AND SUMMARY OF THE INVENTION

The present invention relates to an electro-hydraulically controlled transmission, and in particular to a transmission having one or more releasable coupling mechanisms, such as a clutch or a brake, wherein only one such mechanism needs to be engaged for a transmission output shaft to be drivingly coupled to the input shaft. A two-step actuator valve arrangement is provided in the hydraulic control circuit so that two valves must be moved to open positions to engage a releasable coupling mechanism.

It is common in vehicle transmissions, such as a power shift transmission, to have a number of clutches and/or brakes that are selectively engageable in various combinations to route power through the transmission to produce different gear ratios. In a typical power shift transmission, multiple clutches and/or brakes must be engaged to provide power to the transmission output shaft. To engage multiple clutches or brakes, multiple valves in the hydraulic circuit need to be opened. Multiple valves are needed because different combinations of brakes and clutches must be engaged to produce different transmission gear ratios. A dedicated valve controls each clutch and brake. The need for multiple valves to be opened to provide power to the output shaft significantly reduces the likelihood of inadvertently doing so due to a valve sticking in an open position.

The present invention is useful in a transmission where only a single releasable coupling mechanism, such as a clutch or brake, needs to be engaged to provide power to the output shaft. The present invention provides a two-step actuator valve arrangement in which two valves arranged in series must be opened before any releasable coupling mechanism is engaged to power the output shaft. In the present invention, a single first-step actuator valve is arranged in series with a plurality of second-step actuator valves. The second-step actuator valves are arranged parallel with one another. In the resulting control circuit, both the first-step actuator valve, and one of the second-step actuator valves, must be opened before power is provided to any one of the clutches.

DESCRIPTION OF THE PREFERRED EMBODIMENT

Figure 1:
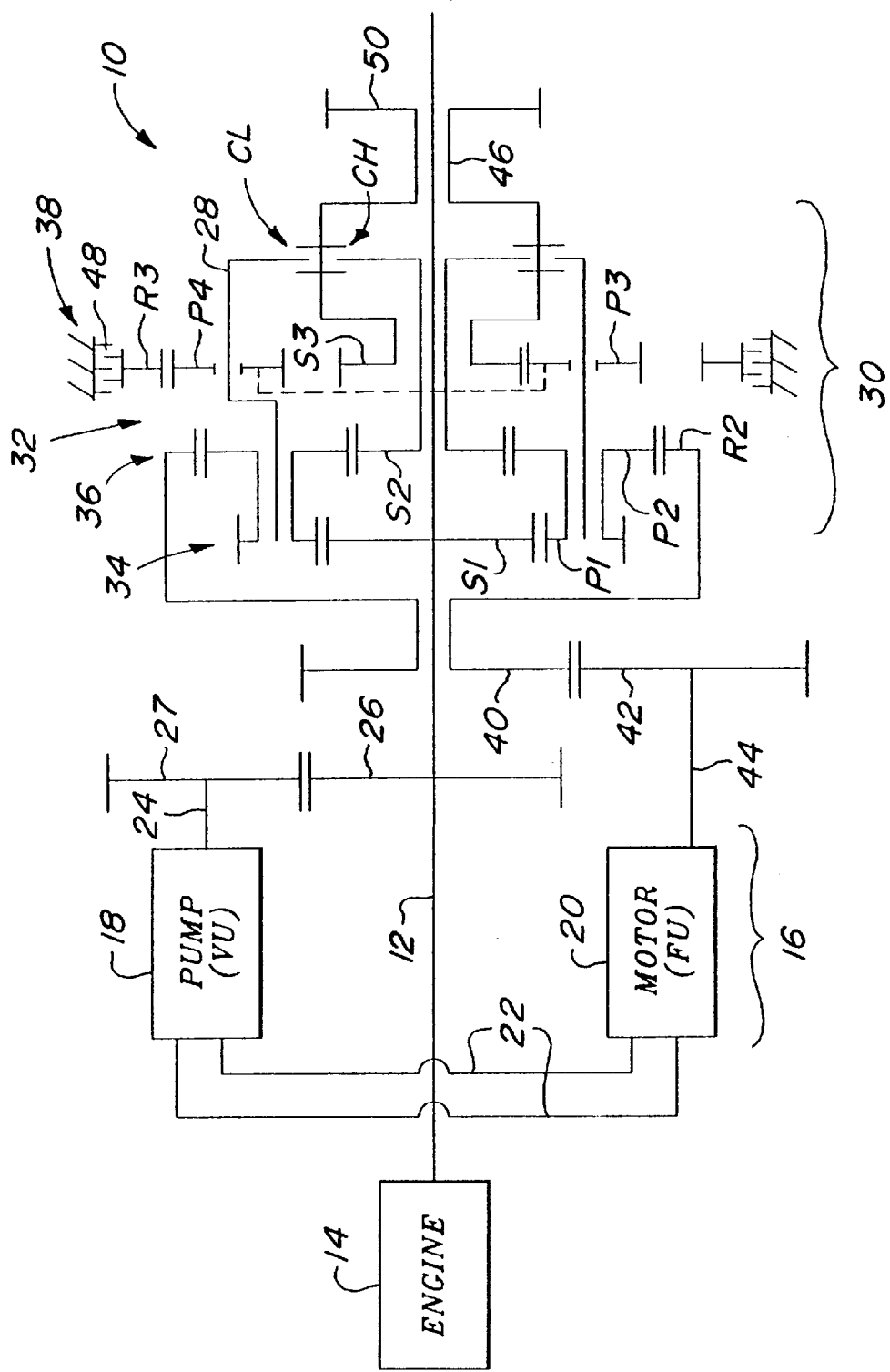
FIG. 1 is a schematic representation of a hydro-mechanical transmission having the two-step clutch actuator valve of the present invention.

A hydro-mechanical transmission having the two-step clutch actuator valve of the present invention is shown schematically in FIG. 1 and designated generally at 10. The transmission 10 is only an example of one transmission that may utilize the two-step clutch actuator valve of the present invention. The transmission 10 has an input shaft 12 that is driven by an engine 14 or other source of rotational power. The transmission has a hydrostatic unit 16 including a variable displacement pump 18 and a fixed displacement motor 20. The pump and motor are coupled hydraulically as shown by the lines 22 to form a hydrostatic transmission unit. Those skilled in the art will recognize that both the pump and the motor may be variable displacement components. The pump has an input shaft 24 that is driven by the transmission input shaft 12 through a pair of gears 26 and 27.

The transmission includes a combining mechanical transmission 30 having planetary system 32. The planetary system 32 includes three planetary gear sets 34, 36, and 38. The planetary gear sets have a common planet gear carrier 28 that carries the integral planet gears P1 and P2 of planetary gear sets 34 and 36 respectively. The carrier 28 also carries the planet gears P3 and P4 of the reversing planetary gear set 38. The planet gears P1 and P2 are integrally formed and thus rotate together. The planet gears P2 mesh with a ring gear R2. The ring gear R2 is formed integrally with a gear 40, coaxial with the transmission input shaft 12. The drive gear 42 drives the gear 40 on a hydrostatic unit output shaft 44. Thus the ring gear R2 serves as a hydrostatic power input element to the combining mechanical transmission.

The transmission input shaft 14 also drives a sun gear S1 of the first planetary gear set 34 whereby the sun gear S1 is the mechanical power input element to the combining mechanical transmission. Sun gear S1 meshes with the planet gear P1. The planetary gear set 36 includes a sun gear S2 meshing with the planet gears P2.

In the transmission 10, the input shaft 12 extends through the entire transmission to drive a power take off, not shown, and/or to drive other vehicle components, such as a hydraulic pump. The output shaft 46 is a sleeve shaft that surrounds the input shaft 12. Two clutches, a low range clutch CL and a high range clutch CH, selectively couple elements of the planetary system to the transmission output shaft 46. The low range clutch CL is engagable to couple the carrier 28 to the output shaft 46 for a low speed forward range. The high range clutch CH is engagable to couple the sun gear S2 to the output shaft 46 for a high-speed forward range.

The output shaft 46 is fixed to the sun gear S3. Ring gear R3 is selectively grounded by the reverse brake 48. This stops the rotation of the ring gear R3 and causes the sun gear S3 to rotate in the reverse direction for a reverse speed range. When the reverse brake 48 is applied, both the low and high range clutches CL and CH are disengaged, whereby the sun gear S3 drives the output shaft 46.

The transmission 10 operates in three ranges, a reverse range, a low speed forward range and a high-speed forward range. Each range uses a separate path through the mechanical transmission to the output shaft 46 resulting in unique gear ratios for each range. The low range clutch CL, the high range clutch CH and the reverse brake 48 are all releasable coupling mechanisms that are selectively engageable to couple the output shaft 46 to the input shaft 12.

Figure 2:
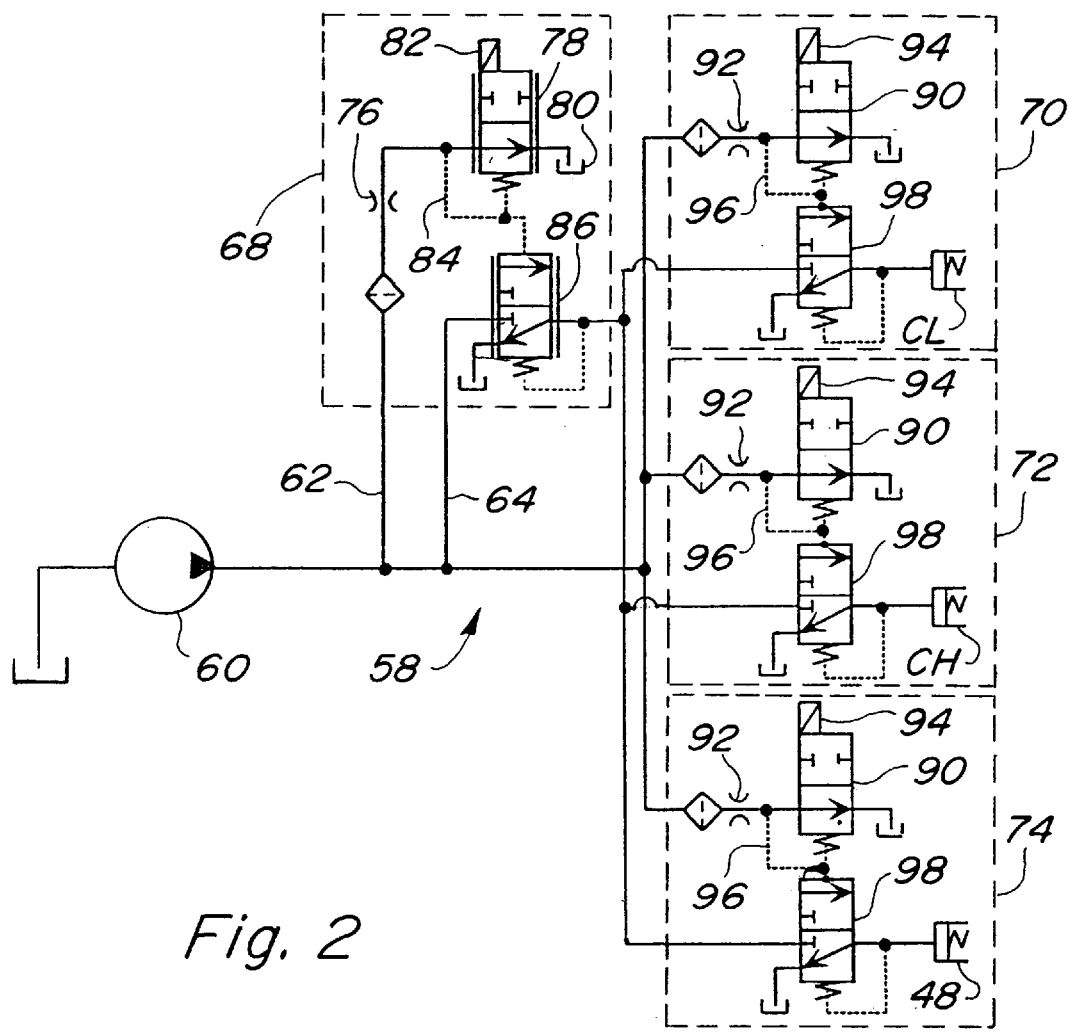
FIG. 2 is a schematic of the hydraulic circuit operable to engage the releasable coupling mechanisms of the transmission.

With reference to FIG. 2, a fluid power circuit is shown for providing fluid power to engage the clutches and brake. The fluid power circuit provides hydraulic power to the transmission, only the portion of the fluid power circuit relevant to the invention is shown in FIG. 2. The circuit includes a pump 60 supplying hydraulic fluid under pressure to lines 62 and 64. Line 62 is a control circuit that is used to operate the actuator valves while the line 64 provides the fluid power to engage the clutches and brake. The circuit 58 includes a single first-step actuator valve 68 that is arranged in series with three second-step actuator valves 70, 72 and 74. The valve 70 operates the low range clutch CL, the valve 72 operates the high range clutch CH and the valve 74 operates the reverse brake 48. The valves 70, 72 and 74 are arranged parallel with one another. Each of the valves 68, 70, 72 and 74 has a solenoid pilot stage and a main stage.

The first-step valve 68 includes a solenoid pilot valve 78 and a main stage valve 86. An orifice 76 is placed in the control line 62 before the pilot valve 78. The pilot valve 78 is normally opened, and leads to the reservoir 80. When the solenoid 82 is energized, the pilot valve 78 is closed, and a pressurized fluid is directed through the line 84 to move the spool of the main stage valve 86 to the open position. This allows pressurized fluid from the line 64 to flow through the valve 86 and to each of the valves 70, 72 and 74.

Each of the valves 70, 72 and 74 are similarly constructed and have a pilot valve 90 that receives fluid from the control line 62 through an orifice 92. When any one of the solenoids 94 are energized, the pilot valves 90 are closed, providing fluid through the line 96 to open the respective main stage valve 98. The circuit 58 requires that two valves must be opened to engage any one of the low range clutch, the high range clutch or the reverse brake. Each clutch and brake requires that the first-step valve 68 and one of the second-step valves be opened. Thus, the probability of inadvertent clutch or brake engagement due to a valve remaining open is reduced. It will be appreciated by those skilled in the art that any number of second-step valves can be arranged with the first-step valve 68 depending on the number of clutches and brakes in the transmission.

The valve 68 is a modulating valve allowing the fluid flow through the valve to be modulated. This valve is designed for operation with a vehicle clutch pedal to allow the operator to partially engage a clutch by partially releasing the clutch pedal.

Having described the preferred embodiment, it will become apparent that various modifications can be made without departing from the scope of the invention as defined in the accompanying claims.

We claim:

1. A transmission comprising:
   an input shaft;
   an output shaft;
   three releasable coupling mechanisms selectively engagable to drivingly couple the output shaft to the input shaft wherein one of the three releasable coupling mechanisms is the only releasable coupling mechanism that needs to be engaged in order to couple the output shaft to the input shaft, the three releasable coupling mechanisms being engagable by fluid power; and
   a fluid power circuit operable to selectively supply fluid power to the three releasable coupling mechanisms, the circuit including two valve assemblies arranged in series with one another, the valve assemblies being selectively movable between open and closed positions that permit and prevent the flow of fluid therethrough, respectively, wherein both valves must be in the respective open positions to provide fluid power to the releasable coupling mechanism and wherein one of the two valve assemblies comprises one of three valve members arranged in parallel with one another in the fluid power circuit with each of the three valve members operable to provide fluid power to one of the three releasable coupling mechanisms and the other of the two valve assemblies comprises a fourth valve member arranged in series with the three parallel valve members wherein the fourth and one of the three valve members must be open to engage any one of the releasable coupling mechanisms.

2. The transmission as defined by claim 1 wherein the valve assemblies are electronically actuated.

3. The transmission as defined by claim 2 wherein the valve assemblies are moved to the open position by energizing a solenoid.

4. The transmission as defined by claim 1 wherein at least one of the valve assemblies is a modulating valve assembly.

5. A hydro-mechanical transmission comprising:
   input and output shafts;
   a high range releasable coupling mechanism, a low range releasable coupling mechanism and a reversing releasable coupling mechanism each selectively engagable to drivingly couple the output shaft to the input shaft wherein each of the releasable coupling mechanisms is the only releasable coupling mechanism that need be engaged at any given time to drivingly couple the output shaft to the input shaft, each of the releasable coupling mechanisms being engagable by fluid power; and
   a fluid power circuit operable to selectively supply fluid power to the releasable coupling mechanisms, the circuit including a plurality of valve assemblies selectively movable to open positions that permit the flow of fluid therethrough to engage each of the releasable coupling mechanisms with the plurality of valve assemblies arranged so that two of the valve assemblies are arranged in series with one another and selectively movable to open positions to engage each of the releasable coupling mechanisms.

6. The transmission as defined by claim 5 wherein for each of the two valve assemblies arranged in series to engage each releasable coupling mechanism, at least one of the valve assemblies is a modulating valve assembly.

7. The transmission as defined by claim 5 wherein the valve assemblies are moved to the open position by energizing a solenoid.

* * * * *